(12) United States Patent
Berry et al.

(10) Patent No.: US 8,051,110 B2
(45) Date of Patent: Nov. 1, 2011

(54) IDENTIFYING SCREEN FLOWS TO SUPPORT MULTIPLE ENTITIES AND THEIR DIVERSE RULES WITH A SINGLE APPLICATION INSTANCE

(75) Inventors: Charles Franklin Berry, Apalachin, NY (US); Nitin Jhingan, Vestal, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/267,667

(22) Filed: Nov. 10, 2008

(65) Prior Publication Data

US 2010/0121830 A1    May 13, 2010

(51) Int. Cl.
  *G06F 7/00*  (2006.01)
(52) U.S. Cl. ......... 707/810; 700/11; 705/26.1; 705/300; 707/602; 707/608; 707/781; 709/202; 709/218; 715/201; 715/209; 715/235; 719/311; 719/320
(58) Field of Classification Search .................. 707/602, 707/608, 781, 810; 700/11; 705/26.1, 300; 709/202, 218; 715/201, 209, 235; 719/311, 719/320
See application file for complete search history.

(56) References Cited

U.S. PATENT DOCUMENTS

| 6,493,704 | B1 | 12/2002 | Hichwa et al. |
| 6,505,202 | B1 | 1/2003 | Mosquera et al. |
| 6,654,814 | B1 * | 11/2003 | Britton et al. ................. 709/246 |
| 7,191,410 | B1 | 3/2007 | Kruempelmann et al. |
| 7,899,690 | B1 * | 3/2011 | Weinstock et al. ............... 705/5 |

\* cited by examiner

*Primary Examiner* — Etienne Leroux
*Assistant Examiner* — Bruce Witzenburg
(74) *Attorney, Agent, or Firm* — Schmeiser, Olsen & Watts; John R. Pivnichny

(57) ABSTRACT

A method and a system for identifying screen flows. An instance of an application utilized by a first entity locates a first key in a first table to identify a first procedure. The same instance of the application utilized by a second entity locates a second key in the first table to identify a second procedure. Using the first procedure, a method and a parameter set based on rules of the first entity are located in a second table. Using the second procedure, the method and a parameter set based on rules of the second entity are located in the second table. The method is executed with each of the parameter sets to identify a first screen flow for the first entity and a second screen flow for the second entity. The first screen flow includes data elements that are different from data elements included in the second screen flow.

20 Claims, 7 Drawing Sheets

| PROCEDURE ID | CORPORA-TION ID | BUSINESS FUNCTION CODE | PROCEDURE NAME |
|---|---|---|---|
| IBM_TWO_STEP_FLOW | IBM | DET_SCRNS | PTScreenAsgn -> GLSummScreenAsgn |
| IBM_THREE_STEP_FLOW | IBM | DET_SCRNS | PTScreen -> GLScreen -> SummScreen flow |
| ... | ... | ... | ... |

| BUSINESS FUNCTION CODE | CORPORATION ID | ENTITY KEY | PROCEDURE ID |
|---|---|---|---|
| DET_SCRNS | IBM | IBM~CART | IBM_TWO_STEP_FLOW |
| DET_SCRNS | IBM | IBM~PAYREQ | IBM_TWO_STEP_FLOW |
| ... | ... | ... | ... |

| PROCEDURE ID | CORPORATION ID | PROCEDURE STEP ID | ... |
|---|---|---|---|
| IBM_TWO_STEP_FLOW | IBM | SFID | ... |
| IBM_THREE_STEP_FLOW | IBM | SFID | ... |

| PROCEDURE ID | CORP ID | STEP ID | STEP ACTION CODE | STEP ACTION STATUS | ORDER | FILTER ID | PARAMETERS | ... |
|---|---|---|---|---|---|---|---|---|
| IBM_TWO_STEP_FLOW | IBM | SFID | SFID | SFID | 1 | SimpleSFI | Names=PTScreenAsgn: GLSummScreenAsgn | ... |
| IBM_THREE_STEP_FLOW | IBM | SFID | SFID | SFID | 1 | SimpleSFI | Names=PTScreen: GLScreen:SummScreen | ... |

IDENTIFYING SCREEN FLOWS TO SUPPORT MULTIPLE ENTITIES AND THEIR DIVERSE RULES WITH A SINGLE APPLICATION INSTANCE

FIELD OF THE INVENTION

The present invention relates to a data processing method and system for identifying screen flows in support of multiple entities having multiple rules, and more particularly to a technique for identifying a sequence of screens having accounting data elements that correspond to a corporation that has a particular set of business rules.

BACKGROUND OF THE INVENTION

A conventional system providing multi-corporation support for an accounting application requires every corporation using the system to have the same accounting business logic. Corporations using such a conventional system are required to perform expensive and time-consuming re-engineering of their business processes to match the capabilities of the accounting application. Furthermore, the conventional system is inflexible, as each corporation's set of accounting business logic requires a separate instance of the accounting application. Thus, there exists a need to overcome at least one of the preceding deficiencies and limitations of the related art.

SUMMARY OF THE INVENTION

The present invention provides a computer-implemented method of identifying a screen flow. A callee application receives a first set of data elements from a first document provided by a first entity utilizing a calling application being executed by a first computing system. The callee application is being executed by a second computing system. The first entity specifies a first set of rules. The callee application receives a second set of data elements from a second document provided by a second entity utilizing the calling application. The second entity specifies a second set of rules. After receiving the first set of data elements, the callee application locates a first entity key in a first database table. A result of locating the first entity key is an identification of a first procedure for identifying a first screen flow. The first database table associates the first entity key with the first procedure. The first entity key includes a first set of one or more key data elements included in the first set of data elements. After receiving the second set of data elements, the callee application locates a second entity key in the first database table. A result of locating the second entity key is an identification of a second procedure for identifying a second screen flow. The first database table associates the second entity key with the second procedure. The second entity key includes a second set of one or more key data elements included in the second set of data elements. After locating the first entity key, the callee application locates a method and a first set of parameters in a second database table. The second database table associates the method and the first set of parameters with the first procedure. The first set of parameters is based on the first set of rules. After locating the second entity key, the callee application locates the method and a second set of parameters in the second database table. The second database table associates the method and the second set of parameters with the second procedure. The second set of parameters is based on the second set of rules. A first screen flow is identified by executing the method with the first set of parameters. A second screen flow is identified by executing the method with the second set of parameters. The first screen flow is displayed on a first display device. The first screen flow includes one or more data elements of the first set of data elements based on the first set of rules. The second screen flow is displayed on a second display device. The second screen flow includes one or more data elements of the second plurality of data elements based on the second set of rules. Identifying the first screen flow and the second screen flow is performed by an instance of the callee application. The one or more data elements of the first set of data elements are different from the one or more data elements of the second set of data elements.

A system, computer program product, and process for supporting computing infrastructure corresponding to the above-summarized method are also described and claimed herein.

BRIEF DESCRIPTION OF THE DRAWINGS

FIG. 3 is an exemplary procedure table utilized in the process of FIGS. 2A-2B and the process of FIG. 2C, in accordance with embodiments of the present invention.

FIG. 4 is an exemplary procedure selection criteria table utilized in the process of FIGS. 2A-2B and the process of FIG. 2C, in accordance with embodiments of the present invention.

FIG. 5 is an exemplary procedure step table utilized in the process of FIGS. 2A-2B and the process of FIG. 2C, in accordance with embodiments of the present invention.

FIG. 6 is an exemplary step action logic table utilized in the process of FIGS. 2A-2B and the process of FIG. 2C, in accordance with embodiments of the present invention.

DETAILED DESCRIPTION OF THE INVENTION

Overview

Figure 1:
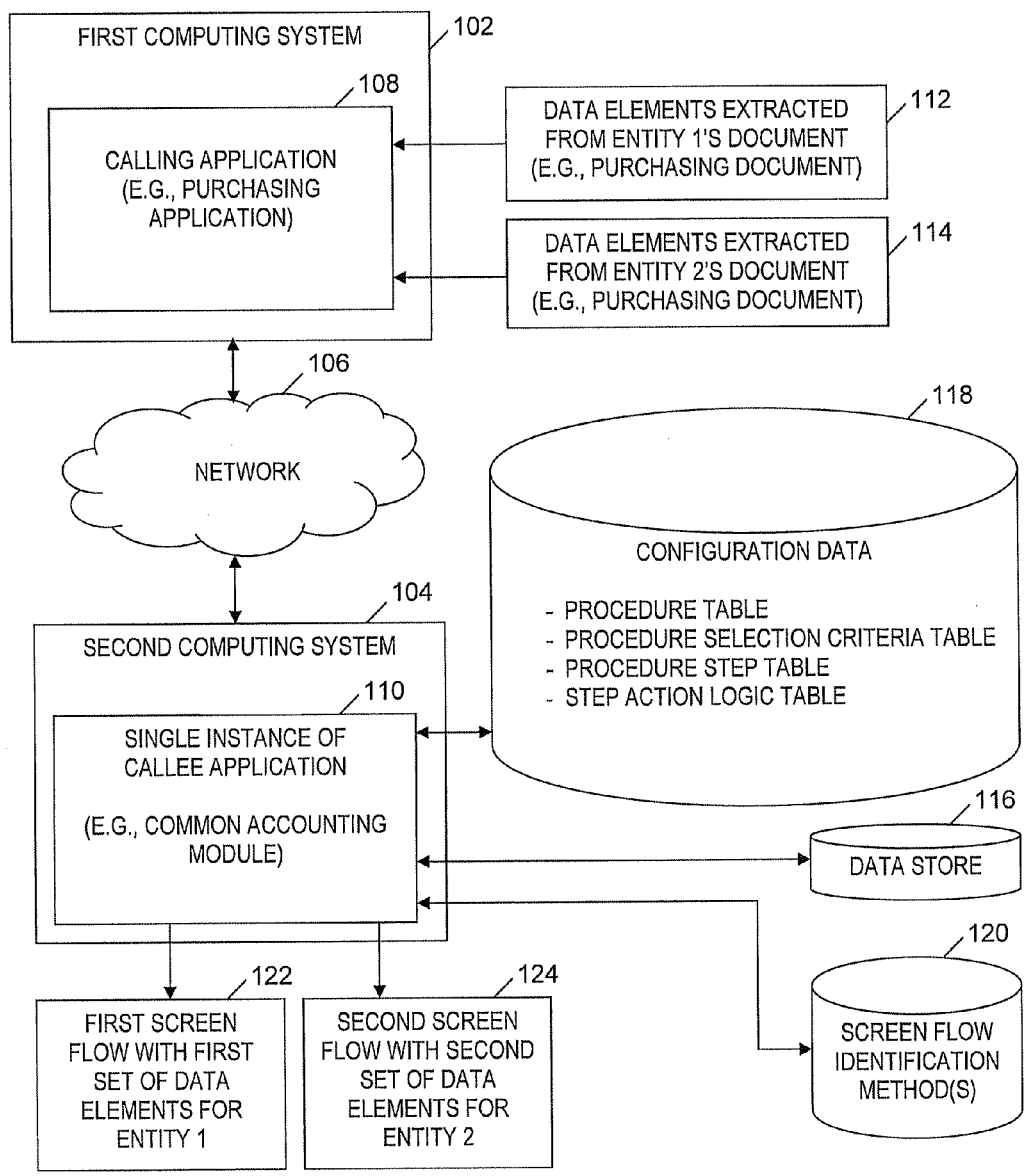
FIG. 1 is a block diagram of a system for identifying screen flows to support multiple entities having multiple sets of business rules via a single application instance, in accordance with embodiments of the present invention.

A software-based calling application (i.e., sending application) executing on a first computer extracts data elements from a document provided by an entity (i.e., a business entity, such as a corporation) and sends the extracted data elements to a software-based callee application (i.e., receiving application) executing on a second computer. The callee application provides functionality (e.g., an accounting function) that requires the extracted data elements to provide a screen flow (i.e., a sequence of screens that include data elements) to an end user. The invention disclosed herein is a technique for identifying screen flows to support multiple entities having multiple sets of rules via a single instance of a software application. Each set of rules is configured in a set of tables (i.e., configuration data tables) designed to identify a screen flow identification method based on certain attributes (e.g., the entity and document type).

The configuration data tables of the present invention provide a data model that supports data for multiple business entities (e.g., multiple corporations). Key data elements are separable by corporation so that an end user does not see data that is not applicable to that end user. For example, the present invention allows multiple corporations to use a single instance of an accounting application, while also allowing an end user of Corporation A to see only Corporation A's account codes and an end user of Corporation B to see only Corporation B's account codes.

The present invention identifies screen flows that include data elements that are required by generally accepted accounting principles, as well as data elements (e.g., accounting data elements) that are unique requirements of a particular business entity. In one embodiment, the present invention provides a common accounting module (CAM) that supports multiple corporations by identifying screen flows that include accounting data elements unique to a particular corporation (a.k.a. new data elements). A new data element included in a screen flow identified by CAM includes, but is not limited to: (1) a data element that needs no validation or that needs simple validation (e.g., based on the length of the data element); (2) a data element that needs to be searchable, or have a hierarchy, or a relationship to other data elements; and (3) a data element whose value is selected from a predefined list of values.

The present invention's support for multiple business entities also includes support for different sets of business rules and different screen flows via the configuration data tables. Instead of writing code conditional on the business entity to drive the screen flow, the present invention utilizes the flexibility of the configuration data tables to make the screen flow itself configurable for each business entity on a single application instance.

As a first example, the configurable screen flow provided by the present invention supports Corporation A that needs to collect a purchase type on a first screen, and based on that purchase type needs to collect a general ledger account on a second screen (i.e., account screen), and then based on that purchase type and general ledger account, needs to collect other accounting details (e.g., department to charge) on a third screen (i.e., details screen).

As a second example, the configurable screen flow supports Corporation B that does not need to collect a purchase type because all purchases are considered to be an expense charge. In this second example, the screen flow includes only the account screen followed by the details screen.

As a third example, the configurable screen flow supports Corporation C whose very simple business rules specify no dependencies between the purchase type and a general ledger account code and other accounting details. In this third example, the screen flow consists of one screen that combines the collection of purchase type and general ledger account code, as well as the collection of other accounting details.

As used herein, a document is defined as a collection of related data elements produced by a computer application (e.g., calling application). For example, a document is a set of related data elements stored in multiple related database tables (e.g., DB2® tables). As used herein, a rule (e.g., business rule) is defined as a requirement of a business entity. As used herein, a screen included in a screen flow is a web page (e.g., a Hypertext Markup Language (HTML) document).

Screen Flow Identification System

FIG. 1 is a block diagram of a system for identifying screen flows to support multiple entities having multiple sets of business rules via a single application instance, in accordance with embodiments of the present invention. System 100 may include a first computing system 102 and a second computing system 104 that share data via a network 106 (e.g., the Internet). First computing system 102 may execute a single instance of a calling application 108 and second computing system 104 may execute a single instance of callee application 110 to support multiple business entities (e.g., corporations) that have multiple sets of rules (e.g., business rules or business logic). At least two of the multiple business entities being supported by calling application 108 have different sets of business rules. Other business entities of the multiple business entities may have the same set of business rules. A first business entity utilizes calling application 108 to request processing of data elements 112 extracted from a first document. A second business entity, which is different from the first business entity, utilizes calling application 108 to request processing of data elements 114 extracted from a second document, which is different from the first document. In one embodiment, the first document and second document are purchasing documents, where each purchasing document may be in the form of a payment request or a requisition from an online shopping cart.

For example, the calling application is a purchasing (i.e., procurement) application and the callee application is an accounting application. In this example, Entity 1 utilizes the purchasing application to request that the accounting application generate and present a first set of screens to an end user of Entity 1, where each screen presented to the end user of Entity 1 includes a corresponding subset of data elements 112 that were extracted from a first purchasing document (e.g., a payment request or a requisition from a shopping cart). That is, the screens presented for Entity 1 include subsets of data elements 112 in a one-to-one correspondence. The screens included in the first set of screens, the order in which the screens are presented to the end user of Entity 1, and the data elements included in each screen of the first set of screens are determined by one or more of the data elements 112 (e.g., identifiers of the corporation that is Entity 1 and the type of the first purchasing document). Furthermore, in this example, Entity 2 utilizes the purchasing application to request that the accounting application generate and present a second set of screens to an end user of Entity 2, where each screen presented to the end user of Entity 2 includes a corresponding subset of data elements 114 that were extracted from a second purchasing document. The screens included in the second set of screens, the order in which the screens are presented to the end user of Entity 2, and the data elements included in each screen of the second set of screens are determined by one or more of the data elements 114. In this example, the first set of screens is different from the second set of screens.

Data elements 112 and data elements 114 may be stored in one or more data storage units coupled to first computing system 102 and may be accessible by calling application 108. Data elements 112 and data elements 114 may include the same types of parameters that are used as the basis for determining a screen flow for a particular end user (e.g., corporation identifier and purchasing document type).

Callee application 110 receives and stores data elements 112 or 114 in data store 116 and utilizes configuration data 118 to identify one or more screen flow identification methods 120. Configuration data 118 is stored in database tables (e.g., relational database tables) that reside on one or more computer data storage units that may be coupled to second computing system 104 or to another computing system. In one embodiment, the database tables include, but are not limited to, a procedure table, a procedure selection criteria table, a procedure step table, and a step action logic table (see, e.g., FIGS. 3-6). Other database tables that may be included in configuration data 118 include a business function table and a step action table.

The processing by callee application 110 also includes executing the identified screen flow identification method(s) 120 to generate and present a first screen flow 122 if callee application 110 processes data elements 112 or a second screen flow 124 if callee application 110 processes data elements 114. Depending on the parameters received by callee application 110 from data elements 112 and 114, first screen flow 122 may be the same or different from second screen flow 124. Even if the screens are the same in screen flow 122 and screen flow 124, the particular data elements on a screen in screen flow 122 may differ from the particular data elements on the corresponding screen in screen flow 124.

In one embodiment, first screen flow 122 is displayed on a first display device (not shown) and second screen flow 124 is displayed on a second display device (not shown). The first display device may be coupled to second computing system 104, first computing system 102, or to another computing system. Similarly, the second display device may be coupled to second computing system 104, first computing system 102, or another computing system.

In one embodiment, system 100 is implemented by an integrated web application environment in which data is shared between calling application 108 and callee application 110 via a web service. In this embodiment, first computing system 102 includes a web browser (not shown).

Further details about the functionality of the components of system 100 are included in the discussion below relative to FIGS. 2A-2B.

Screen Flow Identification Process

Figure 2A:
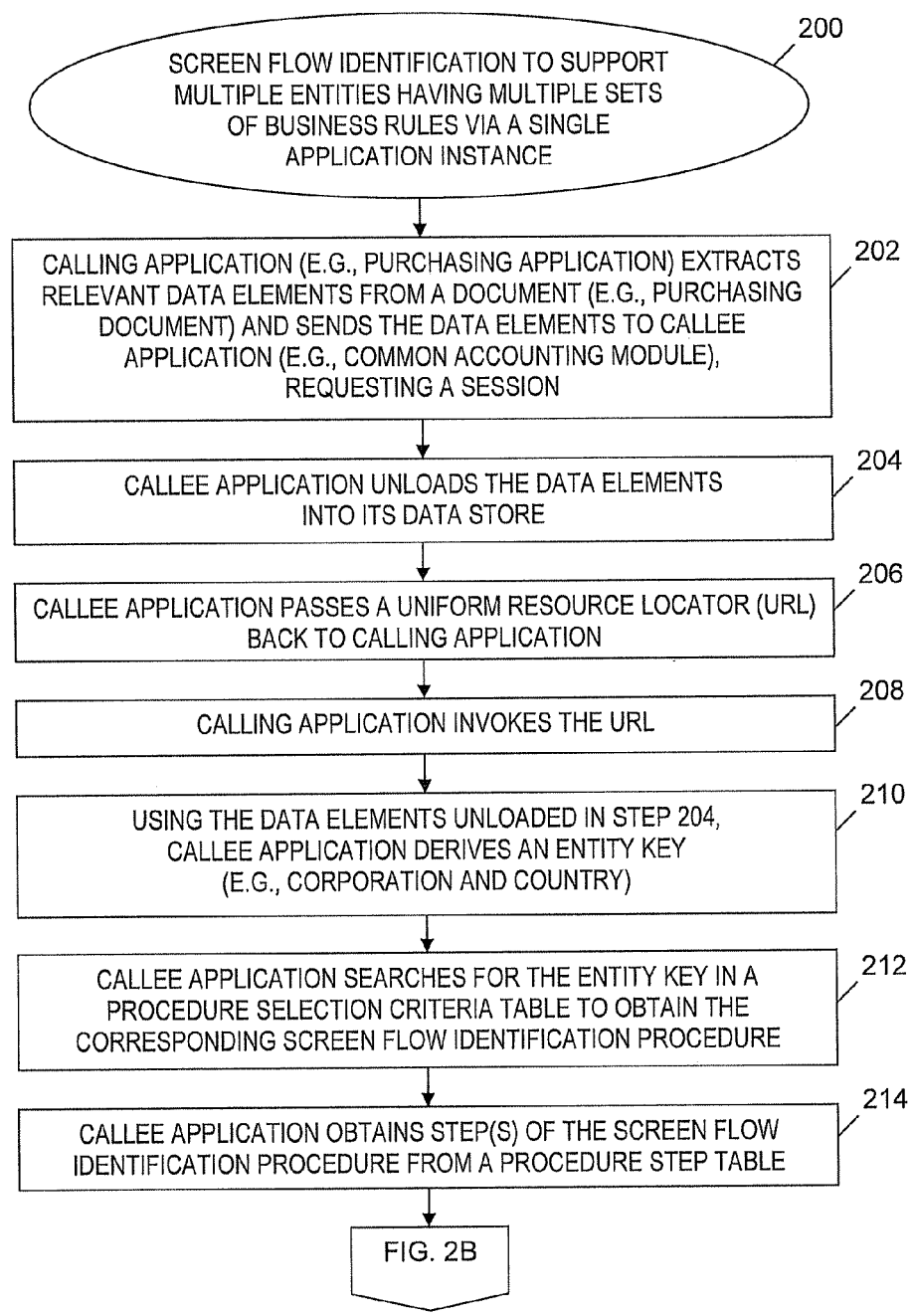
FIGS. 2A-2B depict a flowchart of a process that identifies screen flows to support multiple entities having multiple sets of business rules via a single application instance in the system of FIG. 1, in accordance with embodiments of the present invention.
Figure 2B:
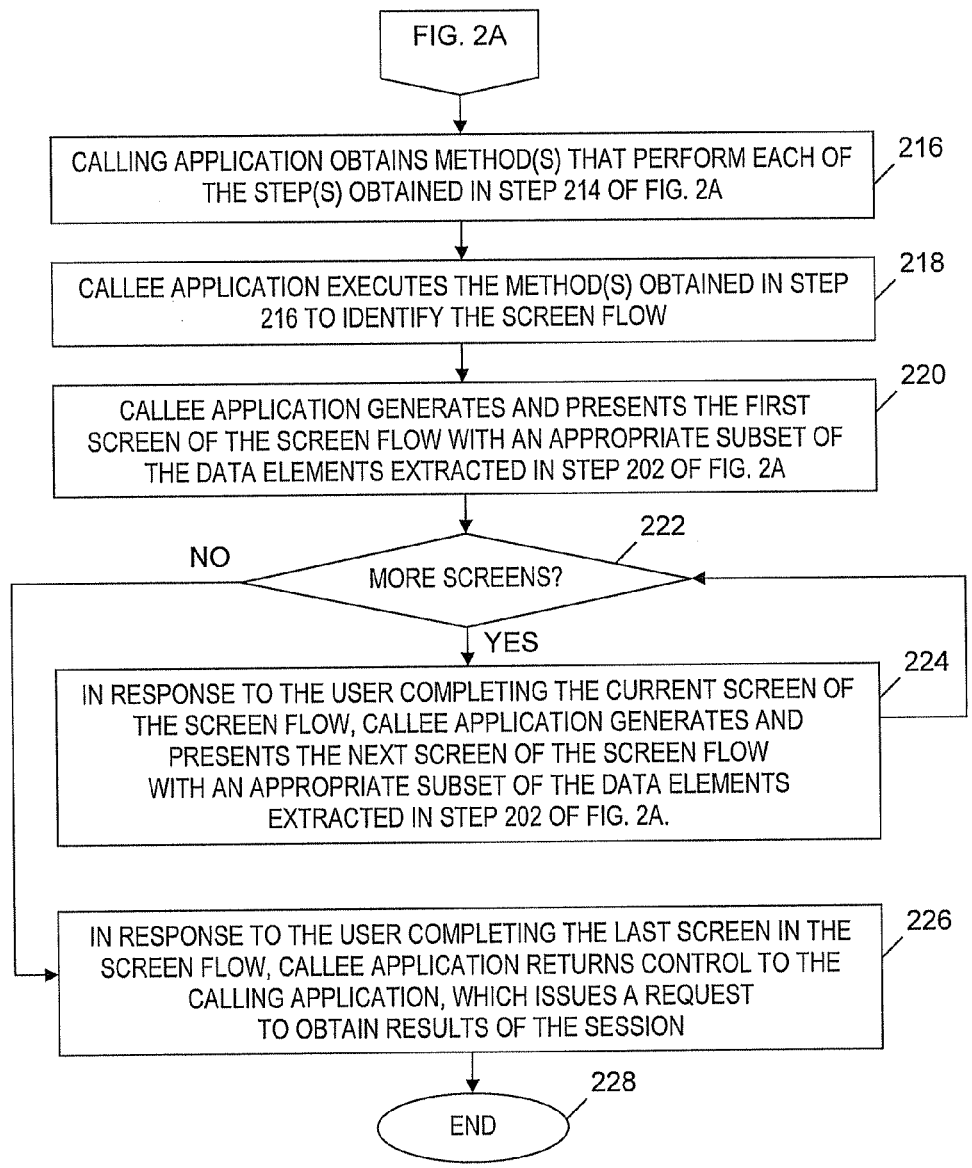

FIGS. 2A-2B depict a flowchart of a process that identifies screen flows to support multiple entities having multiple sets of business rules via a single application instance in the system of FIG. 1, in accordance with embodiments of the present invention. The screen flow identification process starts at step 200 of FIG. 2A with an end user who is utilizing calling application 108 (see FIG. 1) reaching a point in the execution of the calling application at which the end user needs to provide information (e.g., accounting information) to callee application 110 (see FIG. 1). In step 202, calling application 108 (see FIG. 1) extracts relevant data elements (e.g., data elements 112 or 114 of FIG. 1) from a document provided by a business entity and sends the extracted data elements to callee application 110 (see FIG. 1) via network 106 (see FIG. 1), thereby requesting a user session with callee application 110 (see FIG. 1). Hereinafter, the user session with the callee application requested in step 202 is referred to as "the session."

In step 204, callee application 110 (see FIG. 1) receives the extracted data elements sent in step 202 and unloads the extracted data elements into data store 116 (see FIG. 1). In step 206, callee application 110 (see FIG. 1) passes a uniform resource locator (URL) back to calling application 108 (see FIG. 1). In step 208, calling application 108 (see FIG. 1) invokes the URL passed in step 206 to initiate the session.

In step 210, using the data elements that were unloaded in step 204, callee application 110 (see FIG. 1) derives an entity key by which the callee application will select a screen flow. In a first embodiment, callee application 110 (see FIG. 1) extracts a corporation ID and a document type from the data elements unloaded in step 204. The corporation ID is an identifier of a corporation or other business entity that provides the document referenced in step 202 and the document type is an identification of the type of the document (e.g., shopping cart requisition or payment request). In the first embodiment, the extracted corporation ID and document type comprise the entity key derived in step 210. In a second embodiment, the entity key is comprised of a corporation ID and a country in which the corporation is located, where the callee application 110 (see FIG. 1) extracts the corporation ID and country from data element unloaded in step 204.

In step 212, callee application 110 (see FIG. 1) searches for the entity key and a predefined business function code in a procedure selection criteria table to obtain a corresponding identifier of a screen flow identification procedure. The procedure selection criteria table is included in configuration data 118 (see FIG. 1) and uniquely associates a combination of an entity key and a business function code with a corresponding identifier of a screen flow identification procedure. In one embodiment, the predefined business function code indicates that a screen flow is to be determined. The procedure selection criteria table may include multiple entity keys, where each entity key is associated with the same business function code that indicates the need for a screen flow determination, and where the entity keys are associated with identifiers of multiple screen flow identification procedures in a one-to-one correspondence.

A screen flow identification procedure identified in the procedure selection criteria table identifies one or more screens to be generated and presented to the end user referenced in step 200.

In step 214, callee application 110 (see FIG. 1) obtains one or more steps of the screen flow identification procedure whose identifier is obtained in step 212. Step 214 obtains the aforementioned one or more steps from a procedure step table included in configuration data 118 (see FIG. 1) that associates the identifier obtained in step 212 with the one or more steps. The procedure step table includes a column that identifies the first step of one or more steps obtained in step 214. After step 214, the screen flow identification process of FIGS. 2A-2B continues with step 216 of FIG. 2B.

In one embodiment, the procedure step table associates screen flow identification procedure identifiers with steps in a one-to-one correspondence (i.e., each screen flow identification procedure is associated with exactly one corresponding step).

In step 216, calling application 108 (see FIG. 1) searches a step action logic table to obtain one or more methods (i.e., algorithms or filters) that perform each of the step(s) obtained in step 214 (see FIG. 2A). The step action logic table associates the screen flow identification procedure obtained in step 212 (see FIG. 2A) with the one or more methods obtained in step 216.

In one embodiment, the screen flow identification procedure includes exactly one step, which is obtained in step 214 (see FIG. 2A), and that one step is performed by exactly one method (i.e., algorithm or filter), which is obtained in step 216. In another embodiment, step 216 obtains multiple methods (i.e., algorithms or filters) that perform a step obtained in step 214 (see FIG. 2A). In still another embodiment, step 216 obtains multiple sets of methods (i.e., algorithms or filters), where the sets of methods perform multiple steps obtained in step 214 (see FIG. 2A), in a one-to-one correspondence.

In step 218, callee application 110 (see FIG. 1) executes the method(s) obtained in step 216 to identify a screen flow to be presented to the end user referenced in step 200 (see FIG. 2A). The execution of the method(s) in step 218 determines what screens are to be presented to the end user and in what order. The identification of the screen flow in step 218 selects a screen flow from multiple predefined screen flows.

In step 220, callee application 110 (see FIG. 1) generates and presents the first screen of the screen flow identified in step 218, where the first screen includes an appropriate subset of the data elements extracted in step 202 (see FIG. 2A) and unloaded in step 204 (see FIG. 2A). The appropriate subset of data elements included in the first screen is determined based on business rules of the business entity (i.e., the business entity that provided the document from which data elements are extracted in step 202 of FIG. 2A). At this point in the process of FIGS. 2A-2B, the current screen is the first screen of the screen flow. Callee application 110 (see FIG. 1) includes the current screen in an internal state of the callee application. The callee application stores its internal state in working memory. In one embodiment, the first screen is presented in step 220 by displaying the first screen on a display device coupled to a computing system and via a web browser.

In step 222, callee application 110 (see FIG. 1) determines whether there is another screen (i.e., a next screen) that immediately follows the current screen in the order of the screen flow identified in step 218. For example, in the first performance of step 222, the callee application determines whether the screen flow identified in step 218 includes a second screen that immediately follows the first screen generated in step 220. If step 222 determines that there is another screen, then the next step in the process of FIGS. 2A-2B is step 224; otherwise, the next step is step 226.

In step 224, in response to the end user completing data entry on the current screen (e.g., completing the entry of accounting data elements on the current screen), callee application 110 (see FIG. 1) generates and presents the next screen of the screen flow and the process of FIGS. 2A-2B loops back to step 222. The next screen generated in step 224 includes an appropriate subset of data elements extracted in step 202 (see FIG. 2A) and unloaded in step 204 (see FIG. 2A). Similar to step 220, the appropriate subset of data elements included in the next screen generated in step 224 is determined based on business rules of the business entity (i.e., the business entity that provided the document from which data elements are extracted in step 202 of FIG. 2A). The next screen generated in step 224 is referred to as the current screen in the next iteration of the loop that consists of step 222 and step 224. In working memory, callee application 110 (see FIG. 1) updates the current screen in the internal state of the callee application by indicating that the next screen generated in step 224 is the updated current screen. In one embodiment, the next screen is presented in step 224 by displaying the next screen on a display device coupled to a computing system and via a web browser.

Step 226 follows the determination in step 222 that there is not a next screen in the screen flow. In step 226, in response to the end user completing data entry on the last screen in the screen flow (e.g., completing entry of accounting data elements on the last screen), callee application 110 (see FIG. 1) returns control to the calling application 108 (see FIG. 1), which issues a request to obtain results of the session. The results of the session are generated by the callee application 110 (see FIG. 1) as a result of processing the data entered by the end user on the screen(s) of the screen flow (see steps 224 and 226). Following step 226, the process of FIGS. 2A-2B ends at step 228.

In an alternate embodiment (a.k.a. multi-step procedure embodiment), the procedure step table used in step 214 (see FIG. 2A) lists each screen in a screen flow as a separate step of multiple steps in a screen flow identification procedure identified in the procedure step table. Then callee application 110 (see FIG. 1) uses a procedure flow table (not shown) to determine the order in which the screens are to be generated and presented. The procedure flow table includes, for example, a procedure ID column, a corporation ID column to identify the business entity, a predecessor step ID column, and a successor step ID column. One or more other columns may include information for tracking updates to the data stored in the procedure flow table. The procedure identified in the procedure ID column is included in one or more rows, each row indicating a step in the predecessor step ID column, which is immediately followed by a step in the successor step ID column. Thus, the multiple rows of predecessor and successor steps in the procedure flow table define the sequence of screens in a screen flow.

Figure 2C:
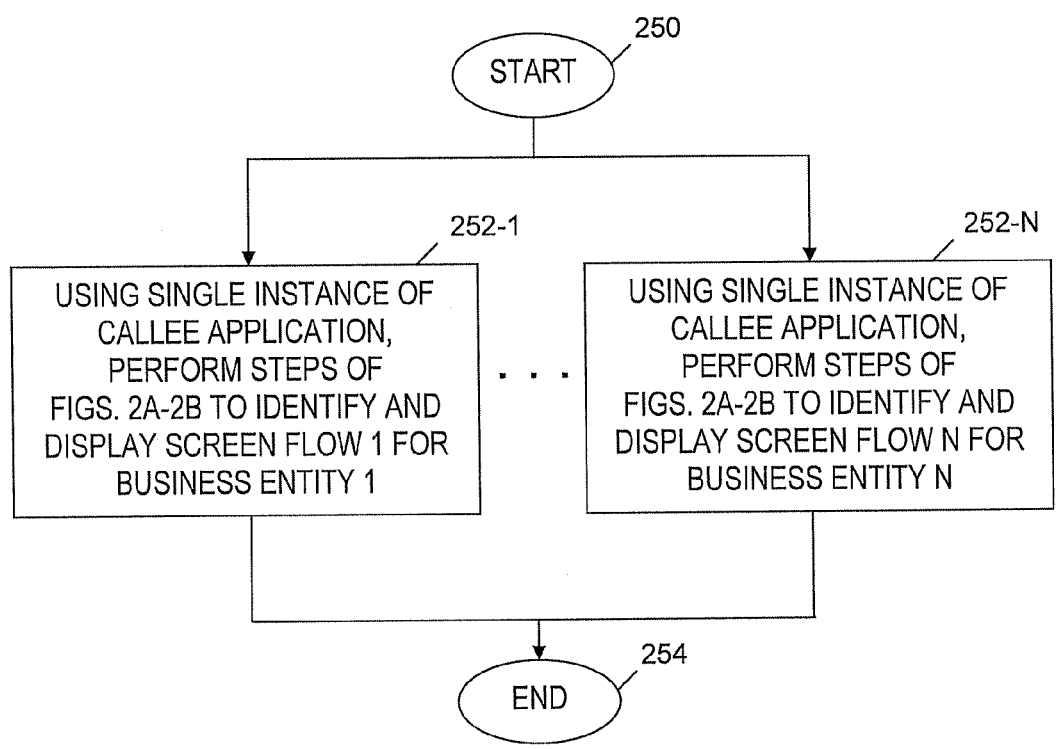
FIG. 2C is a flowchart of a process that performs the steps of the process of FIGS. 2A-2B for multiple entities having multiple rules, in accordance with embodiments of the present invention.

FIG. 2C is a flowchart of a process that performs the steps of the process of FIGS. 2A-2B for multiple entities having multiple rules, in accordance with embodiments of the present invention. The process of FIG. 2C starts at step 250. The set of steps 252-1, ..., 252-N include multiple analogous steps that each perform the steps of the process of FIGS. 2A-2B using the same single instance of callee application 110 (see FIG. 1).

Step 252-1 performs steps 200-214 of FIG. 2A and steps 216-228 of FIG. 2B to identify and display screen flow 1 (i.e., first screen flow) for business entity 1 (i.e., first business entity) during a user session for end user 1 (i.e., first user session). Similarly, step 252-N performs steps 200-214 of FIG. 2A and steps 216-228 of FIG. 2B to identify and display screen flow N (i.e., N-th screen flow) for business entity N (i.e., N-th business entity) during a user session for end user N (i.e., N-th user session).

Generally, step 252-$i$ in the set of steps 252-1, ..., 252-N performs steps 200-214 of FIG. 2A and steps 216-228 of FIG. 2B to identify and display an i-th screen flow for an i-th business entity during an i-th user session and step 252-$j$ in the set of steps 252-1, ..., 252-N performs steps 200-214 of FIG. 2A and steps 216-228 of FIG. 2B to identify and display a j-th screen flow for a j-th business entity during a j-th user session. Steps 252-$i$ and 252-$j$ use the same set of configuration data tables and the same types of values in their respective entity keys (i.e., each entity key consists of a corporation identifier and a document type).

The i-th user session includes identifying an i-th screen flow identification procedure, executing a screen flow identification method (i.e., filter) with an i-th set of parameters, and displaying the i-th screen flow that include an i-th set of data elements that were originally extracted from an i-th document. Similarly, the j-th user session includes identifying a j-th screen flow identification procedure, executing the screen flow identification method with a j-th set of parameters, and displaying the j-th screen flow that include a j-th set of data elements that were originally extracted from a j-th document.

The i-th screen flow resulting from step 252-$i$ may be the same as or different from the j-th screen flow resulting from step 252-$j$. If two screen flows are different, then the screen flows include different sets of screens and/or include different numbers of screens. The i-th set of data elements used in the i-th screen flow is different from the j-th set of data elements used in the j-th screen flow, because the sets of business rules associated with the i-th and j-th business entities are different.

The i-th and j-th screen flow identification procedures obtained in steps 252-$i$ and 252-$j$, respectively, may be the same or different, but the screen flow identification method (i.e., filter) that is executed as the single step of the i-th and j-th screen flow identification procedure is the same in steps 252-$i$ and 252-$j$. The results of the execution of the same screen flow identification method differs in cases in which the i-th set of parameters used by the screen flow identification method in the i-th user session differs from the j-th set of parameters used by the screen flow identification method in the j-th user session.

Any step 252-*i* and step 252-*j* in the set of steps 252-1, ..., 252-N may be performed concurrently or sequentially. Further, any portion of step 252-*i* may be performed concurrently or sequentially with any portion of step 252-*j*.

Following steps 252-1, ..., 252-N, the process of FIG. 2C ends at step 254. The steps 250, 252-1, ..., 252-N, and 254 are performed by a single instance of calling application 108 (see FIG. 1) and a single instance of callee application 110 (see FIG. 1), while the identification and display of screen flows by steps 252-1, ..., 252-N support multiple business entities.

In one embodiment, steps 252-1, ..., 252-N use the multi-step procedure embodiment described above relative to FIGS. 2A-2B.

Sample Code for Screen Flow Identification Method

Code snippet 1 presented below is sample code that implements the screen flow identification method executed in step 218. Code snippet 1 is executed once at the beginning of an end user's accounting session. The function of Code snippet 1 is to execute a procedure whose steps identify the ordered sequence of screen layout group type names.

Code Snippet 1:

```
protected void executePAI( ) throws ApplicationException{
    UnitOfWork uow = UOWFactory.getSingleton( ).produce( );
    try{
        uow.openForRead( );
        String sfiType =
            (String)getParameters( ).get(CAMCmdParmNames.SFI_TYPE);
        CAMDocComponent cdc = getDocComponent(sfiType);
        List flow = new ArrayList( );
            SFIStep[ ] steps =
            SFIStepsFactory.getSingleton( ).determineSteps(sfiType,cdc);
            for(int i=0;i<steps.length;i++){
                ScrnFlowIdentifier sfi =
                SFIFactory.getSingleton( ).produce(cdc,steps[i]);
                String[ ] sf = sfi.identify( );
                flow.addAll(Arrays.asList(sf));
            }//EndFor
        setFlow(sfiType,flow);
        getParameters( ).setCommandExecutionStatus((String)flow.get(0));
    }finally{
        if(uow != null && uow.isOpen( )){uow.close(false);}
    }//EndTryFinally
}//EndMethod
```

Code snippet 2 presented below is sample code whose function is to parse the parameters of the screen flow identification method included in Code snippet 1.

Code Snippet 2:

```
private void parse( ){
    String ordrParm = getParameters( ).getProperty(SFIParmNames.SCRN_GRP_TYPE_NAMES);
    if(ordrParm == null){
        LogMsg lm = new LogMsg(this.getClass( ).getName( ),"SimpleSFIImpl");
        throw new ApplicationRTException(lm.writeMsg(
            LogMsg.SEVERE,PkgMsg.GROUP,"CFG001",SFIParmNames.SCRN_GRP_TYPE_NAMES));
    }//Endif
    names = ordrParm.split(".");
    if(names.length == 1 && names[0].length( ) == 0){
        LogMsg lm = new LogMsg(this.getClass( ).getName( ),"SimpleSFIImpl");
        throw new ApplicationRTException(lm.writeMsg(
            LogMsg.SEVERE,PkgMsg.GROUP,"CFG002",SFIParmNames.SCRN_GRP_TYPE_NAMES));
    }//Endif
}//EndMethod
```

Code snippet 3 presented below is sample code whose function is to identify the ordered list of screen layout group type names.

Code Snippet 3:

```
public String[ ] identify( ) throws ApplicationException{
    return names;
}//EndMethod
```

Sample Configuration Data Tables

FIG. 3 is an exemplary procedure table utilized in the process of FIGS. 2A-2B and the process of FIG. 2C, in accordance with embodiments of the present invention. Procedure table 300 allows system 100 (see FIG. 1) to define multiple screen flows to satisfy heterogeneous sets of business rules (or homogeneous sets of business rules) of different business entities. Table 300 includes a procedure identifier (ID) column 302, a corporation ID column 304, a business function code column 306 and a procedure name column 308. Table 300 may also include one or more additional columns 310, such as columns that track changes to data in table 300.

The IBM_TWO_STEP_FLOW procedure ID in column 302 defines a first screen flow consisting of the following sequence of two screens, which are named in the procedure name column 308: PTScreenAsgn (i.e., a screen that collects an end user's selection of a purchase type) and GLSummScreenAsgn (i.e., a screen that collects the end user's selection of a general ledger account and collects other accounting details). The IBM_THREE_STEP_FLOW procedure ID in column 302 defines a second screen flow consisting of the following sequence of three screens, which are named in the procedure name column 308: PTScreen (i.e., a screen that collects the end user's selection of a purchase type), GLScreen (i.e., a screen that collects the end user's selection of a general ledger account), and SummScreen (i.e., a screen that collects other accounting details).

FIG. 4 is an exemplary procedure selection criteria table utilized in the process of FIGS. 2A-2B and the process of FIG. 2C, in accordance with embodiments of the present invention. Procedure selection criteria table 400 includes a business function code column 402, a corporation ID column 404, an entity key column 406 and a procedure ID column 408. Table 400 may include additional columns 410 (e.g., for tracking changes to data in table 400).

Table 400 allows system 100 (see FIG. 1) to establish an association between a document sent in step 202 of FIG. 2A and a particular screen flow specified by a procedure specified in table 300 (see FIG. 3). Each entity key entry in column 406 is a unique combination of the following attributes: corporatype of the document sent in step 202 (see FIG. 1). Each entry in column 406 is in the format of corporation-document type.

Step 212 of FIG. 2A uses the attributes in an entity key in column 406 to identify the corresponding screen flow identification procedure identified in column 408. That is, each data row of table 400 associates a unique combination of corporation and document type in column 406 (i.e., an entity key) with a corresponding procedure ID in column 408. This association between entity key and procedure ID provided by table 400 allows callee application 110 (see FIG. 1) to generate and present a screen flow that is uniquely associated with an entity key.

For example, a screen flow indicated by the procedure IBM_TWO_STEP_FLOW (see the first data entry in column 408) is generated and presented in response to processing a shopping cart (i.e., CART) document from International Business Machines Corporation (IBM) (i.e., entity key=IBM~CART).

FIG. 5 is an exemplary procedure step table utilized in the process of FIGS. 2A-2B and the process of FIG. 2C, in accordance with embodiments of the present invention. Procedure step table 500 includes a procedure ID column 502, a corporation ID column 504, a procedure step ID column 506 and may include one or more other columns 508 (e.g., a descriptive code for a procedure step identified in column 506, an indication of which steps in column 506 start and end each procedure identified in column 502, and values that track updates to the data in table 500).

Table 500 is used in step 214 (see FIG. 2A) to determine the one or more steps included in the screen flow identification procedure that was identified in step 212 (see FIG. 2A). For example, step 212 (see FIG. 2A) identifies the screen flow identification procedure IBM_TWO_STEP_FLOW and step 214 (see FIG. 2A) identifies the first data row of table 500 as including an IBM_TWO_STEP_FLOW entry in column 502. Furthermore, step 214 (see FIG. 2A) identifies the entry in column 506 (i.e., SFID, which indicates "screen flow identification") that corresponds to the identified IBM_TWO_STEP_FLOW entry. Thus, in the example of this paragraph, SFID is determined to be the only step of the screen flow identification procedure IBM_TWO_STEP_FLOW.

FIG. 6 is an exemplary step action logic table utilized in the process of FIGS. 2A-2B and the process of FIG. 2C, in accordance with embodiments of the present invention. Step action logic table 600 includes a procedure ID column 602, a corp ID (i.e., corporation ID) column 604, a step ID column 606, a step action code 608, a step action status 610, an order column 612 (i.e., "order by" numbers to place screen flow identification methods of a step in a sequence), a filter ID column 614 (i.e., identifiers of screen flow identification methods), and a parameters column 616. Table 600 may include one or more other columns 618 that track updates of the data in table 600. The filter algorithm (i.e., SimpleSFI) identified in column 614 is an example of a screen flow identification method (i.e., an action) described above relative to FIG. 1 and FIGS. 2A-2C. The execution of filter SimpleSFI identifies the next screen to be displayed to the end user.

Table 600 is used in step 216 (see FIG. 2B) to determine the order in which filter algorithms (i.e., screen flow identification methods) are to be executed, where the filter algorithms are included in a step of a screen flow identification procedure identified in step 212 (see FIG. 2A). The "order by" numbers in column 612 for a particular step in column 606 and a particular procedure in column 602 indicate the order for executing the filter algorithms in step 218 (see FIG. 2B).

Continuing the example presented above relative to FIG. 5, the first and only step (i.e., the SFID step) of the IBM_TWO_STEP_FLOW procedure consists of the execution of the following filter (see column 614): SimpleSFI. Step 216 (see FIG. 2B) obtains an identifier and parameters for filter SimpleSFI from column 614 and column 616, respectively. The parameters in column 616 are passed to SimpleSFI and are the names of the screens in the screen flow being generated and presented by the process of FIGS. 2A-2B and the process of FIG. 2C. Callee application 110 (see FIG. 1) detects which screen is the current screen and which screen is to be displayed next via the parameters in column 616. For example, if current screen is PTScreenAsgn, then the next screen in the screen flow is GLSummScreenAsgn, as is indicated by the parameters in column 616 for the procedure IBM_TWO_STEP_FLOW identified in column 602.

The result of executing the filtering algorithm (see column 614) in the specified order (see column 612) for each step (see column 606) of a procedure (see column 602) is to generate a first screen or a next screen in the screen flow to be displayed to the end user.

Computing System

Figure 7:
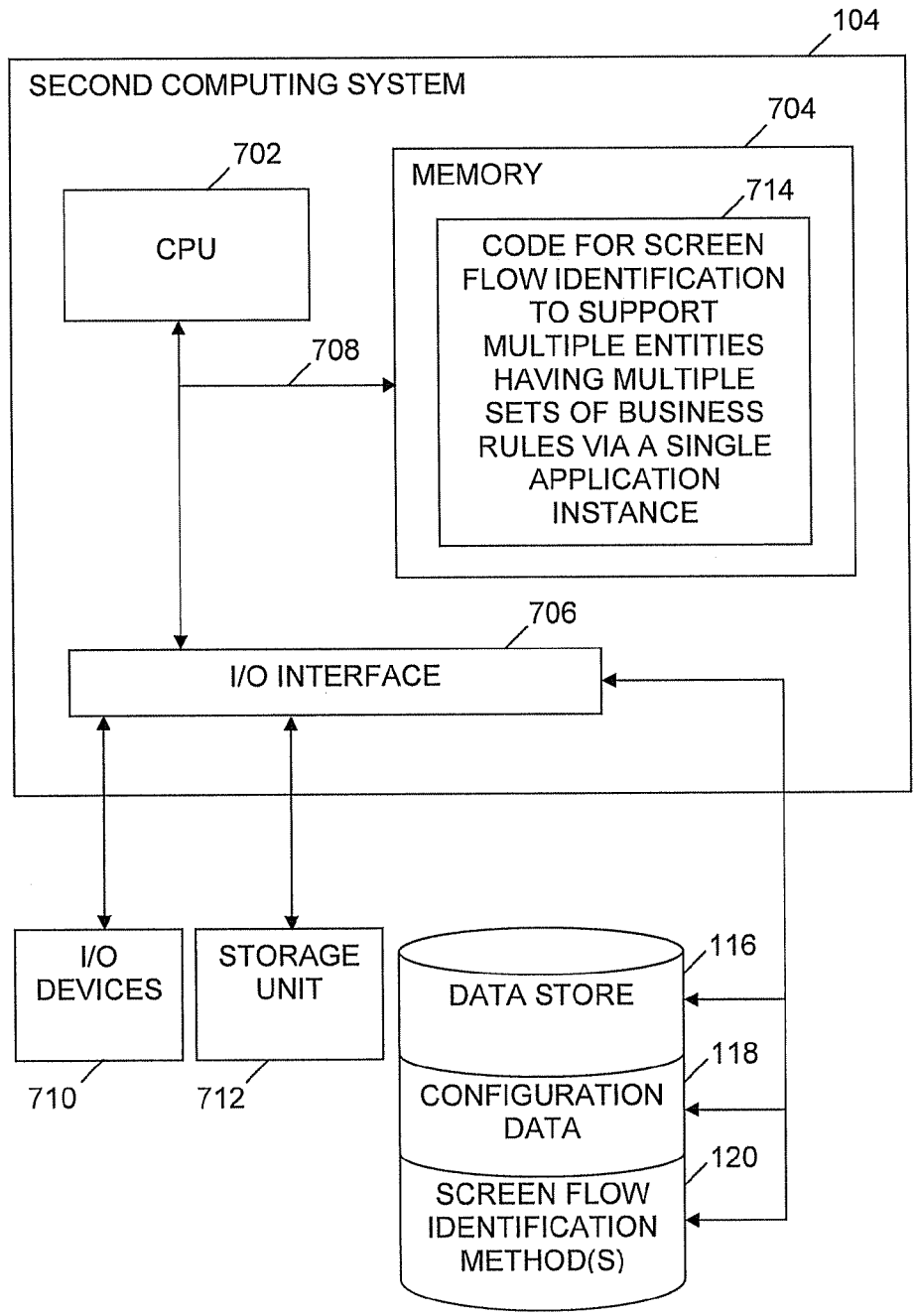
FIG. 7 is a block diagram of a computing system that is included in the system of FIG. 1 and that implements the process of FIGS. 2A-2B and the process of FIG. 2C, in accordance with embodiments of the present invention.

FIG. 7 is a block diagram of a computing system that is included in the system of FIG. 1 and that implements the process of FIGS. 2A-2B and the process of FIG. 2C, in accordance with embodiments of the present invention. Computing system 104 generally comprises a central processing unit (CPU) 702, a memory 704, an input/output (I/O) interface 706, and a bus 708. Further, computing system 104 is coupled to I/O devices 710 and a computer data storage unit 712. Storage unit 712 or one or more other computer data storage units (not shown) that are coupled to computing system 104 may store data store 116, configuration data 118 and screen flow identification method(s) 120. CPU 702 performs computation and control functions of computing system 104. CPU 702 may comprise a single processing unit, or be distributed across one or more processing units in one or more locations (e.g., on a client and server).

Memory 704 may comprise any known type of computer data storage and/or transmission media, including bulk storage, magnetic media, optical media, random access memory (RAM), read-only memory (ROM), a data cache, a data object, etc. In one embodiment, cache memory elements of memory 704 provide temporary storage of at least some program code (e.g., code 714) in order to reduce the number of times code must be retrieved from bulk storage during execution. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computing system 104, and may comprise any type of transmission link, including electrical, optical, wireless, etc.

I/O interface 706 also allows computing system 104 to store and retrieve information (e.g., data or program instructions such as code 714) from an auxiliary storage device such as computer data storage unit 712 or another computer data storage unit (not shown). Computer data storage unit 712 may be a non-volatile storage device, such as a magnetic disk drive (i.e., hard disk drive) or an optical disc drive (e.g., a CD-ROM drive which receives a CD-ROM disk).

Memory 704 includes computer program code 714 that provides the logic for identifying screen flows to support multiple entities having multiple sets of business rules via a single application instance (e.g., the process of FIGS. 2A-2B). In one embodiment, code 714 is included in callee application 110 (see FIG. 1; not shown in FIG. 7), which is included in memory 704. Further, memory 704 may include other systems not shown in FIG. 7, such as an operating system (e.g., Linux) that runs on CPU 702 and provides control of various components within and/or connected to computing system 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 of FIG. 1 or computing system 104). Furthermore, the present invention may take the form of a computer program product embodied in any tangible medium of expression (e.g., memory 704 or computer data storage unit 712) having computer-usable program code (e.g., code 714) embodied in the medium.

Any combination of one or more computer-usable or computer-readable medium(s) (e.g., memory 704 and computer data storage unit 712) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program 714 is printed, as the program 714 can be electronically captured via, for instance, optical scanning of the paper or other medium, then compiled, interpreted, or otherwise processed in a suitable manner, if necessary, and then stored in a computer memory 704. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., code 714) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server (e.g., computing system 104). In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2A-2B and FIG. 2C) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 714). These computer program instructions may be provided to a processor (e.g., CPU 702) of a general purpose computer (e.g., computing system 104), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 704 or computer data storage unit 712) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., computing system 104) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of identifying screen flows to support multiple entities having multiple sets of business rules via a single application instance. Thus, the present invention discloses a process for supporting computer infrastructure, comprising integrating, hosting, maintaining and deploying computer-readable code (e.g., code 714) into a computing system (e.g., computing system 104), wherein the code in combination with the computing system is capable of performing a method of identifying screen flows to support multiple entities having multiple sets of business rules via a single application instance.

In another embodiment, the invention provides a business method that performs the process steps of the invention on a subscription, advertising and/or fee basis. That is, a service provider, such as a Solution Integrator, can offer to create, maintain, support, etc. a method of identifying screen flows to support multiple entities having multiple sets of business rules via a single application instance. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2B and FIG. 2C and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., code 714), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of identifying a screen flow, said method comprising:
receiving a first plurality of data elements from a first document provided by a first entity utilizing a calling application being executed by a first computing system, wherein said first entity specifies a first set of rules, and wherein said receiving said first plurality of data elements is performed by a callee application being executed by a second computing system;
receiving, by said callee application, a second plurality of data elements from a second document provided by a second entity utilizing said calling application, wherein said second entity specifies a second set of rules;
subsequent to said receiving said first plurality of data elements, locating a first entity key in a first database table by said callee application, wherein a result of said locating said first entity key is an identification of a first procedure for identifying a first screen flow, wherein said first database table associates said first entity key with said first procedure, and wherein said first entity key includes a first set of one or more key data elements included in said first plurality of data elements;
subsequent to said receiving said second plurality of data elements, locating a second entity key in said first database table by said callee application, wherein a result of said locating said second entity key is an identification of a second procedure for identifying a second screen flow, wherein said first database table associates said second entity key with said second procedure, and wherein said second entity key includes a second set of one or more key data elements included in said second plurality of data elements;
subsequent to said locating said first entity key, locating a filter and a first set of parameters in a second database table by said callee application, wherein said second database table associates said filter and said first set of parameters with said first procedure, and wherein said first set of parameters is based on said first set of rules;
subsequent to said locating said second entity key, locating said filter and a second set of parameters in said second database table by said callee application, wherein said second database table associates said filter and said second set of parameters with said second procedure, and wherein said second set of parameters is based on said second set of rules;
identifying a first screen flow by executing said filter with said first set of parameters;
identifying a second screen flow by executing said filter with said second set of parameters;
displaying said first screen flow on a first display device, wherein said first screen flow includes one or more data elements of said first plurality of data elements based said first set of rules; and
displaying said second screen flow on a second display device, wherein said second screen flow includes one or more data elements of said second plurality of data elements based on said second set of rules, wherein said identifying said first screen flow and said identifying said second screen flow are performed by a single instance of said callee application being executed by said second computing system, and wherein said one or more data elements of said first plurality of data elements are different from said one or more data elements of said second plurality of data elements.

2. The method of claim 1, wherein said displaying said first screen flow includes displaying a first ordered sequence of screens of a predefined plurality of screens, wherein said displaying said second screen flow includes displaying a second ordered sequence of screens of said predefined plurality of screens, and wherein said first ordered sequence of screens is different from said second ordered sequence of screens.

3. The method of claim 1, wherein said locating said first entity key includes extracting said first set of one or more key data elements from said first plurality of data elements in response to said receiving said first plurality of data elements from said first document, and wherein said locating said second entity key includes extracting said second set of one or more key data elements from said second plurality of data elements in response to said receiving said second plurality of data elements from said second document.

4. The method of claim 3, wherein said extracting said first set of one or more key data elements includes extracting a first identifier of a corporation (first corporation ID) and a first document type from said first plurality of data elements, wherein said first corporation ID is an identifier of said first entity that provides said first document, wherein said first document type identifies a type of said first document, wherein said extracting said second set of one or more key data elements includes extracting a second identifier of a corporation (second corporation ID) and a second document type from said second plurality of data elements, wherein said second corporation ID is an identifier of said second entity that provides said second document, and wherein said second document type identifies a type of said second document.

5. The method of claim 4, wherein said type of said first document identifies a first purchasing document selected from the group consisting of a payment request and a requisition from an online shopping cart, and wherein said type of said second document identifies a second purchasing document selected from the group consisting of a payment request and a requisition from an online shopping cart.

6. The method of claim 1, wherein said identifying said first screen flow includes identifying a first ordered sequence of web pages based on said first set of parameters, wherein said displaying said first screen flow includes displaying said first ordered sequence of web pages on said first display device, wherein said identifying said second screen flow includes identifying a second ordered sequence of web pages based on said second set of parameters, and wherein said displaying said second screen flow includes displaying said second ordered sequence of web pages on said second display device.

7. The method of claim 6, further comprising:
generating said first ordered sequence of web pages by extracting a first plurality of names of screens from said first set of parameters; and
generating said second ordered sequence of web pages by extracting a second plurality of names of screens from said second set of parameters.

8. The method of claim 1, wherein said locating said first entity key includes retrieving said first procedure from said first database table based on said first procedure being associated with said first entity key in said first database table, wherein said locating said second entity key includes retrieving said second procedure from said first database table based on said second procedure being associated with said second entity key in said first database table.

9. The method of claim 1, further comprising:
obtaining a step of said first procedure based on said step of said first procedure being associated with said first procedure in a third database table; and
obtaining a step of said second procedure based on said step of said second procedure being associated with said second procedure in said third database table.

10. A computing system comprising a processor coupled to a computer-readable memory unit, said memory unit comprising a software application, said software application comprising instructions that when executed by said processor implement the method of claim 1.

11. A computer program product, comprising a computer-readable storage medium having a computer-readable program code stored therein, said computer-readable program code containing instructions configured to be executed by a processor of a second computing system to implement a method of identifying a screen flow, said method comprising:
receiving a first plurality of data elements from a first document provided by a first entity utilizing a calling application being executed by a first computing system, wherein said first entity specifies a first set of rules, and wherein said receiving said first plurality of data elements is performed by a callee application being executed by said second computing system;
receiving, by said callee application, a second plurality of data elements from a second document provided by a second entity utilizing said calling application, wherein said second entity specifies a second set of rules;
subsequent to said receiving said first plurality of data elements, locating a first entity key in a first database table by said callee application, wherein a result of said locating said first entity key is an identification of a first procedure for identifying a first screen flow, wherein said first database table associates said first entity key with said first procedure, and wherein said first entity key includes a first set of one or more key data elements included in said first plurality of data elements;
subsequent to said receiving said second plurality of data elements, locating a second entity key in said first database table by said callee application, wherein a result of said locating said second entity key is an identification of a second procedure for identifying a second screen flow, wherein said first database table associates said second entity key with said second procedure, and wherein said second entity key includes a second set of one or more key data elements included in said second plurality of data elements;
subsequent to said locating said first entity key, locating a filter and a first set of parameters in a second database table by said callee application, wherein said second database table associates said filter and said first set of parameters with said first procedure, and wherein said first set of parameters is based on said first set of rules;
subsequent to said locating said second entity key, locating said filter and a second set of parameters in said second database table by said callee application, wherein said second database table associates said filter and said second set of parameters with said second procedure, and wherein said second set of parameters is based on said second set of rules;
identifying a first screen flow by executing said filter with said first set of parameters;
identifying a second screen flow by executing said filter with said second set of parameters;
displaying said first screen flow on a first display device, wherein said first screen flow includes one or more data elements of said first plurality of data elements based said first set of rules; and
displaying said second screen flow on a second display device, wherein said second screen flow includes one or more data elements of said second plurality of data elements based on said second set of rules, wherein said identifying said first screen flow and said identifying said second screen flow are performed by a single instance of said callee application being executed by said second computing system, and wherein said one or more data elements of said first plurality of data elements are different from said one or more data elements of said second plurality of data elements.

12. The program product of claim 11, wherein said displaying said first screen flow includes displaying a first ordered sequence of screens of a predefined plurality of screens, wherein said displaying said second screen flow includes displaying a second ordered sequence of screens of said predefined plurality of screens, and wherein said first ordered sequence of screens is different from said second ordered sequence of screens.

13. The program product of claim 11, wherein said locating said first entity key includes extracting said first set of one or more key data elements from said first plurality of data elements in response to said receiving said first plurality of data elements from said first document, and wherein said locating said second entity key includes extracting said second set of one or more key data elements from said second plurality of data elements in response to said receiving said second plurality of data elements from said second document.

14. The program product of claim 13, wherein said extracting said first set of one or more key data elements includes extracting a first identifier of a corporation (first corporation ID) and a first document type from said first plurality of data elements, wherein said first corporation ID is an identifier of said first entity that provides said first document, wherein said first document type identifies a type of said first document, wherein said extracting said second set of one or more key data elements includes extracting a second identifier of a corporation (second corporation ID) and a second document type from said second plurality of data elements, wherein said second corporation ID is an identifier of said second entity that provides said second document, and wherein said second document type identifies a type of said second document.

15. The program product of claim 14, wherein said type of said first document identifies a first purchasing document selected from the group consisting of a payment request and a requisition from an online shopping cart, and wherein said type of said second document identifies a second purchasing document selected from the group consisting of a payment request and a requisition from an online shopping cart.

16. A process for supporting computing infrastructure, said process comprising providing at least one support service for at least one of creating, integrating, hosting, maintaining, and deploying computer-readable code in a second computing system, wherein the code in combination with the second computing system is capable of performing a method of identifying a screen flow, said method comprising:

receiving a first plurality of data elements from a first document provided by a first entity utilizing a calling application being executed by a first computing system, wherein said first entity specifies a first set of rules, and wherein said receiving said first plurality of data elements is performed by a callee application being executed by said second computing system;

receiving, by said callee application, a second plurality of data elements from a second document provided by a second entity utilizing said calling application, wherein said second entity specifies a second set of rules;

subsequent to said receiving said first plurality of data elements, locating a first entity key in a first database table by said callee application, wherein a result of said locating said first entity key is an identification of a first procedure for identifying a first screen flow, wherein said first database table associates said first entity key with said first procedure, and wherein said first entity key includes a first set of one or more key data elements included in said first plurality of data elements;

subsequent to said receiving said second plurality of data elements, locating a second entity key in said first database table by said callee application, wherein a result of said locating said second entity key is an identification of a second procedure for identifying a second screen flow, wherein said first database table associates said second entity key with said second procedure, and wherein said second entity key includes a second set of one or more key data elements included in said second plurality of data elements;

subsequent to said locating said first entity key, locating a filter and a first set of parameters in a second database table by said callee application, wherein said second database table associates said filter and said first set of parameters with said first procedure, and wherein said first set of parameters is based on said first set of rules;

subsequent to said locating said second entity key, locating said filter and a second set of parameters in said second database table by said callee application, wherein said second database table associates said filter and said second set of parameters with said second procedure, and wherein said second set of parameters is based on said second set of rules;

identifying a first screen flow by executing said filter with said first set of parameters;

identifying a second screen flow by executing said filter with said second set of parameters;

displaying said first screen flow on a first display device, wherein said first screen flow includes one or more data elements of said first plurality of data elements based said first set of rules; and displaying said second screen flow on a second display device, wherein said second screen flow includes one or more data elements of said second plurality of data elements based on said second set of rules, wherein said identifying said first screen flow and said identifying said second screen flow are performed by a single instance of said callee application being executed by said second computing system, and wherein said one or more data elements of said first plurality of data elements are different from said one or more data elements of said second plurality of data elements.

17. The process of claim 16, wherein said displaying said first screen flow includes displaying a first ordered sequence of screens of a predefined plurality of screens, wherein said displaying said second screen flow includes displaying a second ordered sequence of screens of said predefined plurality of screens, and wherein said first ordered sequence of screens is different from said second ordered sequence of screens.

18. The process of claim 16, wherein said locating said first entity key includes extracting said first set of one or more key data elements from said first plurality of data elements in response to said receiving said first plurality of data elements from said first document, and wherein said locating said second entity key includes extracting said second set of one or more key data elements from said second plurality of data elements in response to said receiving said second plurality of data elements from said second document.

19. The process of claim 18, wherein said extracting said first set of one or more key data elements includes extracting a first identifier of a corporation (first corporation ID) and a first document type from said first plurality of data elements, wherein said first corporation ID is an identifier of said first entity that provides said first document, wherein said first document type identifies a type of said first document, wherein said extracting said second set of one or more key data elements includes extracting a second identifier of a corporation (second corporation ID) and a second document type from said second plurality of data elements, wherein said second corporation ID is an identifier of said second entity that provides said second document, and wherein said second document type identifies a type of said second document.

20. The process of claim 19, wherein said type of said first document identifies a first purchasing document selected from the group consisting of a payment request and a requisition from an online shopping cart, and wherein said type of said second document identifies a second purchasing document selected from the group consisting of a payment request and a requisition from an online shopping cart.

* * * * *